G. F. AND J. W. LAWVER.
PUMP SUPPORTING BRACKET.
APPLICATION FILED JUNE 20, 1918.
1,306,599.
Patented June 10, 1919.
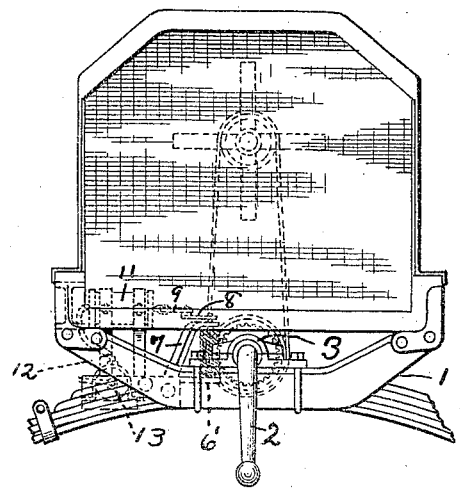
Fig. 1.
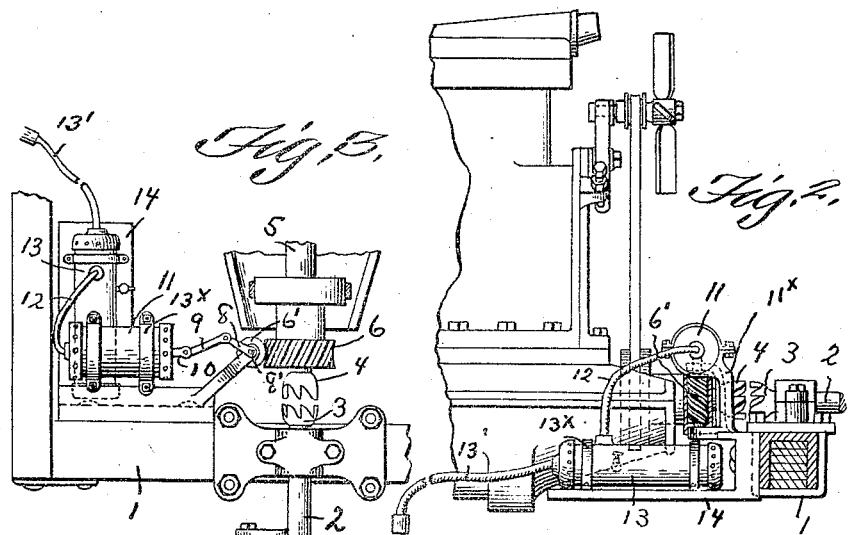
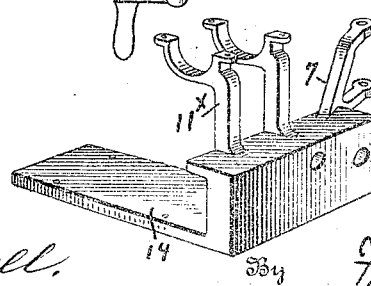
Witnesses
Inventor
Geo F. Lawver and
J. W. Lawver
By Franklin H Hough
Attorneys

UNITED STATES PATENT OFFICE.

GEORGE F. LAWVER AND JONAS W. LAWVER, OF UNIONTOWN, KANSAS.

PUMP-SUPPORTING BRACKET.

1,306,599.

Specification of Letters Patent.   Patented June 10, 1919.

Application filed June 20, 1918.  Serial No. 240,994.

*To all whom it may concern:*

Be it known that we, GEORGE F. LAWVER and JONAS W. LAWVER, citizens of the United States, residing at Uniontown, in the county of Bourbon and State of Kansas, have invented certain new and useful Improvements in Pump-Supporting Brackets; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in pump supporting brackets for automobiles, and consists of a simple and efficient device of this nature, having various details of construction, combinations and arrangements of parts which will be hereinafter fully described, shown in the accompanying drawings and then specifically defined in the appended claim.

Our invention is illustrated in the accompanying drawings which, with the letters of reference marked thereon, form a part of this application and in which:

Figure 1 is a front elevation of an automobile, showing the application of our invention thereto.

Fig. 2 is a sectional view vertically through the forward part of the chassis, showing in elevation parts of the apparatus.

Fig. 3 is a detailed top plan view, and

Fig. 4 is a detailed perspective view.

Reference now being had to the details of the drawings by numerals:

1 designates the chassis of an automobile, having the usual cranking device 2, with a clutch 3 at one end adapted to engage the teeth 4 of the clutch upon the motor shaft 5. Said shaft has keyed thereto a worm gear 6, shown in Fig. 3 of the drawings, and which meshes with a vertically disposed worm wheel 6', having spindle ends 8' journaled in the arms 7 integral with the angle plate 14 which is fastened securely to the chasis of the machine. A crank arm 8 is fixed to one of said spindle ends 8' and is pivotally connected through the medium of the crank 9 with the outer end of the piston 10 within the cylinder 11 of an air pump, said cylinder being supported upon the bracket arms 11$^x$ projecting from the plate 14. A pipe 12 leads from the cylinder 11 and communicates with a tank 13 from which a pipe 13' leads, and forming means whereby air from the tank 13 may be conveyed to the tire to be inflated. Said tank 13 is supported upon the plate 14 and is held securely thereon by means of the straps 13$^x$.

In operation, the motor is started in the usual way and by reason of the gear connection with the pump, the latter may be put in operation to supply air to the tank 13, where it may be stored under pressure in readiness for use. If desired to stop the pump, the pin connecting the worm gear with the pump may be removed.

What we claim to be new is:

A device for supporting a pump upon the chassis of an automobile, comprising a horizontally disposed plate, with an upwardly and inwardly extending inverted L-shaped flange at one end, with integral bracket arms upon the angled end thereof designed to support the pump, and inclined bracket arms at one end thereof forming support for a bearing.

In testimony whereof we hereunto affix our signatures in presence of two witnesses.

GEORGE F. LAWVER.
JONAS W. LAWVER.

Witnesses:
ADDIE J. MOORE,
J. W. MOORE.

Copies of this patent may be obtained for five cents each, by addressing the "Commissioner of Patents, Washington, D. C."